B. H. SILLS.
GRIP TREAD FOR PNEUMATIC TIRES.
APPLICATION FILED DEC. 14, 1907.
901,654.
Patented Oct. 20, 1908.
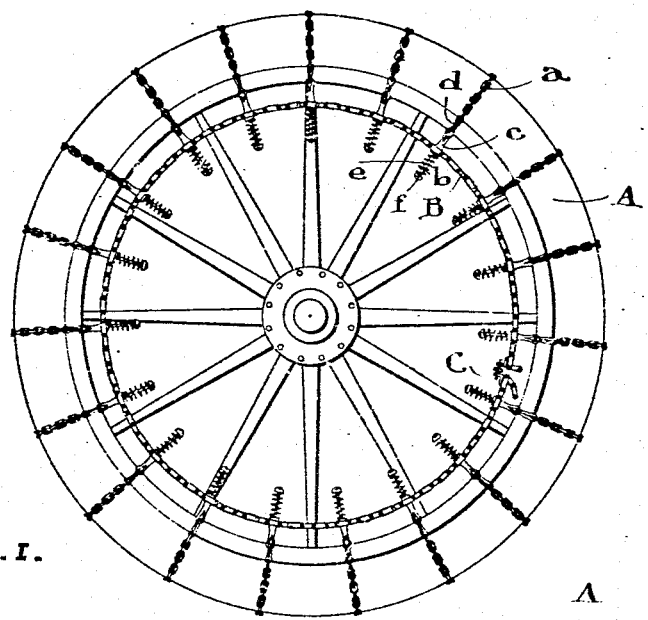
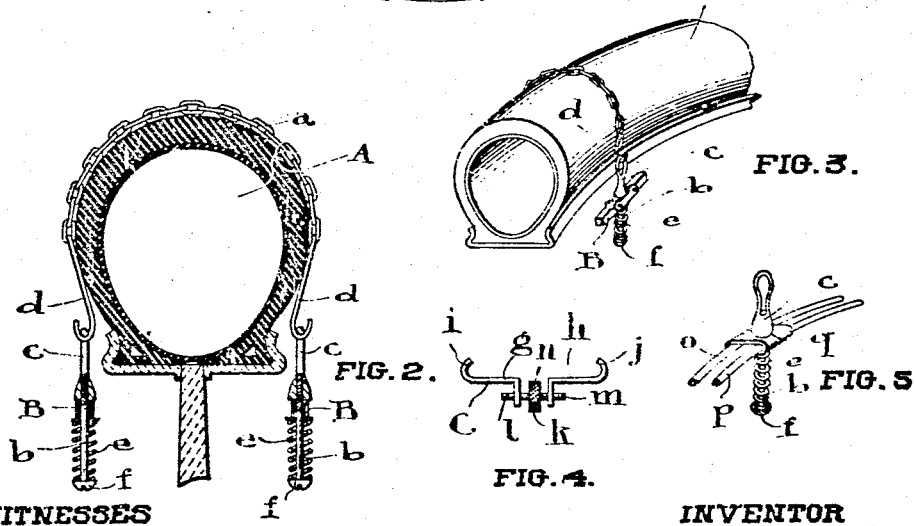
WITNESSES
INVENTOR
B. H. SILLS
ATT'Y

UNITED STATES PATENT OFFICE.

BERTON HERBERT SILLS, OF OTTAWA, ONTARIO, CANADA.

GRIP-TREAD FOR PNEUMATIC TIRES.

No. 901,654.      Specification of Letters Patent.      Patented Oct. 20, 1908.

Application filed December 14, 1907. Serial No. 406,580.

*To all whom it may concern:*

Be it known that I, BERTON HERBERT SILLS, of Ottawa, in the county of Carleton, Province of Ontario, Canada, have invented certain new and useful Improvements in Grip-Treads for Pneumatic Tires, of which the following is a specification.

My invention relates to improvements in grip treads for pneumatic tires, and the objects of my invention are to provide a noiseless grip tread which will adhere closely to the tire, and in which all the transverse gripping members will be independently adjustable and held in position in such a manner that they are free to roll about their own axes and thus equalize the wear on all sides.

In its construction the invention includes a plurality of transverse gripping members which extend on each side through flexible annular connecting members and springs extending between the transverse gripping members and the annular members, all as hereinafter more fully set forth and described in the accompanying specifications and drawings.

In the drawings, Figure 1 is a side view of a wheel and tire equipped with my improved grip tread. Fig. 2 is an enlarged transverse sectional detail of the same. Fig. 3 is a perspective detail of one of the transverse gripping members. Fig. 4 is a side view of a tensioning device which may be applied to the annular member. Fig. 5 is a perspective view showing an alternative form of annular member.

In the drawings, like letters of reference indicate corresponding parts in each figure.

Referring to the drawings, A represents a tire of any suitable construction and $a$ is a plurality of transverse flexible gripping members, preferably and usually, in the form of chains. These members are connected on each side of the wheel to flexible, annular members B, the character of the connection being such that the transverse members may be free to roll about their own axes and will be held resiliently against the tires. In the preferred embodiment, this is accomplished by making the annular members in the form of chains, and in particular, the ordinary form of bicycle chain, I have found may be conveniently employed for this purpose.

The transverse members are connected to the annular member through the medium of bolts $b$ having eyelet heads $c$ engaged by hooks $d$ on the gripping members and compression springs $e$ extending between the inner side of the annular member and the head $f$ of the bolt. The eyelet head $c$ is preferably separated from the bolt and has a screw-threaded engagement therewith, as illustrated in Fig. 2, whereby the tension of the spring may be adjusted if desired.

To take up any slack in the annular member or to reduce the length thereof, when there is occasion to remove any of the gripping members, as for instance, when the grip tread is to be used on light dry roads, a tightening device C is provided. This consists of two claw members $g$ and $h$, having hooks $i$ and $j$ adapted to engage the links of the chain, a screw member $k$ having right and left-hand screws $l$ and $m$ on opposite sides thereof, which extend through and engage the claw members, and a thumb screw $n$ for turning the same. By this means the two claw members, and consequently the ends of the chain may be drawn closer together or separated as desired.

In the alternative form shown in Fig. 5, the annular member is in the form of two wires $o$ and $p$, which have transverse U-shaped brackets $q$ slidable thereon, in which the bolts $b$ are supported.

It will be observed that the bolts may freely turn on their axes in the annular member and consequently, each transverse member may roll about its axis, and thus equalize the wear on all sides. Further than this, the bolts may be very rapidly removed and thus the number of transverse members changed and arranged to suit the character of the road.

When it is desired to remove the grip tread, the transverse members may be very quickly unhooked from their respective bolts and the whole grip tread packed in a very small space.

Each transverse gripping member being held independently with a resilient pressure against the tire, the whole tread will be noiseless in its operation, which, as well as adding to the comfort of the user, will decrease the amount of wear on the transverse members.

While the invention has been described herein, with great particularity of detail, yet it will be readily understood that in carrying out the construction of the same, changes, within the scope of the appended claims, may be made, without departing from the spirit of the invention.

What I claim as my invention is:—

1. An anti-slipping device for vehicle wheels, comprising transverse chains to pass across the tread of the wheel, annular chains on each side of the wheel but disconnected therefrom, bolts on the extremities of the transverse chains extending through the annular chains, and rotatable with respect thereto, whereby the bolts and transverse chains are free to rotate about their longitudinal axes as they creep around the periphery of the wheel.

2. An anti-slipping device for vehicle wheels, comprising a flexible member to pass across the tread of the wheel, bolts connected to the extremities of the same, and means disconnected from the wheel for supporting the bolts with freedom both to move longitudinally and rotate about their longitudinal axes, whereby the bolts and flexible members may roll as they creep around the periphery of the wheel.

3. An anti-slipping device for vehicle wheels comprising annular members on each side of the wheel but disconnected therefrom, and transverse flexible members adapted to pass across the tread of the wheel, said flexible members having their extremities connected to said annular members with freedom both to move outwardly and inwardly and rotate bodily about their longitudinal axes, whereby the said flexible members may roll as they creep around the periphery of the wheel, and means for exerting an independent inward resilient pull on the extremities of each flexible member.

4. A non-slipping device for vehicle wheels, comprising transverse flexible members to pass across the tread of the wheel, bolts on the extremities of the said flexible members and annular members on each side of the wheel disconnected therefrom, having means for journaling the bolts, whereby the said bolts and flexible members may roll about their longitudinal axes, as they creep about the periphery of the wheel, and springs extending between the bolts and the annular members adapted to exert an independent inward resilient pull on each bolt.

In witness whereof I have hereunto set my hand in the presence of two witnesses.

BERTON HERBERT SILLS.

Witnesses:
RUSSEL S. SMART,
MARY C. LYON.